United States Patent [19]

White et al.

[11] Patent Number: 5,054,466

[45] Date of Patent: Oct. 8, 1991

[54] OFFSET TRUSS HEX SOLAR CONCENTRATOR

[75] Inventors: John E. White, Melbourne; James D. Sturgis, Palm Bay; Raymond J. Erikson, Orlando; Gregg A. Waligroski, Palm Bay, all of Fla.; Michael A. Scott, Charlottesville, Va.

[73] Assignee: Harris Corporation, Melbourne, Fla.

[21] Appl. No.: 19,699

[22] Filed: Feb. 27, 1987

[51] Int. Cl.⁵ .................................................. F24J 2/12
[52] U.S. Cl. ..................................... 126/438; 126/451
[58] Field of Search ............... 126/424, 425, 438, 451, 126/439; 350/613, 616

[56] References Cited

U.S. PATENT DOCUMENTS

| | | | |
|---|---|---|---|
| 2,987,961 | 6/1961 | Cotton et al. | 126/451 X |
| 3,905,352 | 9/1975 | Jahn | 126/438 |
| 3,998,206 | 12/1976 | Jahn | 126/438 |
| 4,256,088 | 3/1981 | Vindum | 126/418 |
| 4,296,737 | 10/1981 | Silk | 126/438 |
| 4,408,595 | 10/1983 | Broyles et al. | 126/424 |
| 4,433,672 | 2/1984 | Hale et al. | 126/419 |
| 4,599,995 | 7/1986 | Dane | 126/438 |
| 4,656,996 | 4/1987 | Aharon | 126/438 |

*Primary Examiner*—Allen J. Flanigan
*Attorney, Agent, or Firm*—Evenson, Wands, Edwards, Lenahan & McKeown

[57] ABSTRACT

A solar energy concentrator system comprises an offset reflector structure made up of a plurality of solar energy reflector panel sections interconnected with one another to form a piecewise approximation of a portion of a (parabolic) surface of revolution rotated about a prescribed focal axis. Each panel section is comprised of a plurality of reflector facets whose reflective surfaces effectively focus reflected light to preselected surface portions of the interior sidewall of a cylindrically shaped solar energy receiver. The longitudinal axis of the receiver is tilted at an acute angle with respect to the optical axis such that the distribution of focussed solar energy over the interior surface of the solar engine is optimized for dynamic solar energy conversion. Each reflector panel section comprises a flat, hexagonally shaped truss support framework and a plurality of beam members interconnecting diametrically opposed corners of the hexagonal framework recessed within which a plurality of (spherically) contoured reflector facets is disposed. The depth of the framework and the beam members is greater than the thickness of a reflector facet such that a reflector facet may be tilted (for controlling the effective focus of its reflected light through the receiver aperture) without protruding from the panel section.

11 Claims, 7 Drawing Sheets

FOCUS 20

PARENT PARABOLOID
F/D = 0.25, F = 9.00 M

OFFSET TRUSS HEX SOLAR CONCENTRATOR

The invention described herein was made in the performance work under NASA Contract No. NASA 3-24666 and is subject to provisions of Sec. 305 of the National Aeronautic and Space Art of 1958 (72 STAT 434:42 U.S.C. 2457).

FIELD OF THE INVENTION

The present invention relates in general to solar energy collection apparatus and is particularly directed to a space deployable solar collector system configured of an offset reflector shaped as a surface of revolution (e.g. a paraboloid reflector) made up of a plurality of multi-faceted hexagonal panels arranged to focus reflected solar energy into a receiver having an optical flux receiving surface of revolution, the longitudinal axis of which is oriented at an angle with respect to the focal axis of the reflector surface geometry.

BACKGROUND OF THE INVENTION

With the availability of a practical extraterrestrial payload delivery system (e.g. the space shuttle), science and engineering research and development facilities have accelerated their efforts to design and construct orbital systems (e.g. space station and orbiting defense weaponry), where advantage can be taken of weightlessness and the absence of the electromagnetic absorption and reflection characteristics of the earth's atmosphere. Power for such systems is expected to be supplied by large, point-focusing solar energy devices which will use extensive (e.g. parabolic reflector) surfaces in order to concentrate the sun's energy and the attain the temperatures needed to operate efficient cycles for generating the vast quantities of electricity projected to be used.

Currently developed point-focussing devices that reflect sunlight into a solar energy receiver may be grouped or classified into three principal configurations: 1-large fixed dishes fed by an array of flat mirrors (heliostats) which track the sun; 2-fixed tower mounted receiver arrangements with sun tracking heliostats individually aimed at the focal point receiver; and 3-gimbal mounted symmetric parabolic dishes which track the sun directly (analogous to radio telescopes).

The fixed-dish approach is secured to an anchored, solid structure. Consequently, a very accurate paraboloidal reflector (composed of small, rectangular, second surface glass, with spherically contoured facets to allow accurate aiming toward the focal point) can be produced, making this type of solar energy collection system a candidate for terrestrial construction. On the other hand, because of its considerable size and mass, its attendant heliostats, and double reflected energy loss, it is not a practical solution to spaceborne applications.

The power tower approach eliminates the double reflectance loss of the fixed-dish, but requires an inordinate amount of space to accommodate all the heliostats (which must be aimed at the same point without mutual blockage).

The third type of device, the gimballed parabolic dish, provides a compact package with acceptable optical efficiency. However, unlike a radio telescope receiver horn, its solar energy receiver is massive, and imposes not only a shading loss due to the shadow it and its support structure casts on the concentrator, but a substantial weight penalty, as the mirror surface and receiver positions must not deflect significantly as the collector tracks the sun. If the power conversion and condenser units are located remote from the receiver, hot fluid lines must be run along the receiver support struts, giving rise to additional thermal losses and structural distortion. If the power conversion and condenser units are co-located with the receiver at the focal point, additional shading and support penalties are incurred.

One proposal that has been suggested for solving the problems of such configurations has been to use a Cassegrainian optical configuration. However, upon closer examination several reasons why such a concentrator has been not been successfully constructed become apparent. First, a Cassegrainian configuration incurs a double reflectance loss, and the secondary reflector produces at least as much shading as a receiver. The lower total reflectance necessitates a larger primary reflector to gather the same amount of energy as a basic Newtonian dish. Also, the secondary reflector can be made only so small before the concentrated sunlight from the primary either melts the secondary reflector or mandates the use of a secondary cooling system.

On the other hand, compatibility with presently available receiver configurations requires the use of a relatively large secondary reflector to produce the desired 'cone angle' (typically 90° to 120°). A sufficiently large secondary reflector would have to be half the size of the primary which, in turn, would have to be twice as large as a comparable Newtonian reflector! For a spaceborne application, this size penalty would eliminate any drag advantage over a photovoltaic approach. In addition, the secondary reflector would have to be a deployable structure, since it would be too large to fit into the space shuttle in one piece, with a collateral increase in alignment criticality.

In addition to point-focussing devices, there have been proposed line-focussing configurations employing an offset parabolic trough, such as described in U.S. Pat. No. 4,296,737. An offset trough provides a simpler reflective surface (curved in only two dimensions) and is thereby easier to fabricate than a paraboloid. However, because the reflective surface is only two dimensionally curved, it focuses sunlight along only a linear strip region of the back interior wall of the receiver, so that the collection area is limited (a line vs. the entire surface area of the interior wall of a cylinder). Consequently, the theoretical maximum concentration (watts/sq. meter) is less and thus inhibits system thermal efficiency. Moreover, the trough approach shares the bulkiness problem of the fixed dish and power tower configurations and the opto-structural problems of the gimballed dish design.

Thus, it will be appreciated that although a variety of solar concentrator designs have been proposed (including those for use in space applications), most involve relatively large, bulky structures which are limited in potential for growth by their mass and the stowed volume of their collectors. The fixed-dish and power tower approaches will not work in a planetary orbit, since they will not accommodate 360 degrees of sun-tracking. A parabolic trough has a significantly limited concentration ability; also, conventional parabolic dishes possess the above-discussed shortcomings. Still, designers have continued to work on proposals that enable a symmetric dish concentrator to be practically space-deployable (in terms of stowability and deployment from its transport vehicle (space shuttle cargo bay). These proposals include petalline and hexagonal panel geometries, various inflatable designs and electrostatically controlled membranes.

Petalline geometries are radially symmetrical and can be scaled. However, they suffer from poor packaging efficiency and the need for very large spherical optics.

Hexagonal panel systems have significantly improved modularity and offer enhanced packaging efficiency and ease of deployment over petalline designs. However, in sizes that can be stowed efficiently within a transport vehicle (e.g. the space shuttle) the individual hex panels still require the fabrication of large, aspheric optical surfaces. (It should also be recalled that flat or substantially planar hexagonal panels that conform with one another edgewise to form a prescribed two dimensional shape do not readily 'nest' together to form a three dimensionally contoured surface, as the dimensions become drastically distorted over the three dimensional surface.)

Inflatable configurations (balloons) stow more efficiently than hexagonal panel systems. However, sunlight must pass through the balloon to reach the reflective surface, thus constraining the choice of materials used. In addition, maintaining the accuracy of the surface geometry is debatable at best, and cannot be overcome by increasing the size of the reflector.

The electrostatically controlled membrane is not yet a practically deployable structure since it must first be radially pretensioned against a sturdy hoop structure and then provide a very stiff back-up for the million or so electrostatic actuators that would be required to control the surface contour. In addition, even if the hoop and back-up structures could be made lighter than an equivalent dish and the controls made reliable enough for long life, there is still some question as to the effect that slicing through the earth's magnetic field at orbital velocity would have on the delicate electrostatic forces shaping the surface.

SUMMARY OF THE INVENTION

In accordance with the present invention the above-mentioned shortcomings of conventional solar energy collection structures are obviated by an improved solar energy concentrator system which possesses low area density and mass, so as to facilitate its stowage aboard currently employed space payload transport systems (e.g. the space shuttle), and which deploys to a configuration that produces no shadowing of its reflector, while maintaining close proximity of the receiver, radiator, engine and concentrator to each other and the gimbal axis to minimize the moment of inertia of the very massive components. Pursuant to the invention the solar energy concentrator system comprises a reflector structure made up of a plurality of solar energy reflector panel sections interconnected with one another to form a piecewise approximation of a portion of a conical surface of revolution (e.g. paraboloid) rotated about a prescribed focal axis. The reflector structure is offset from the focal axis, so as to avoid shadowing of the reflector surface by the solar energy receiver and its attendant support structure. Each panel section is comprised of a plurality of reflector facets whose reflective surfaces may be individually adjustable to effectively focus reflected light to preselected surface portions of the flux collecting surface of a solar energy receiver. The solar energy receiver may be a cylindrical solar energy receiver whose collecting surface is symmetrical with respect to a plane containing the axis of the receiver. The solar energy receiver has a solar energy receiving aperture through which sunlight that has been reflected (and focussed) by the facets of the offset reflector panel sections enters the interior of the receiver and impinges upon its light collecting surface. The longitudinal axis of the receiver intersects the solar energy reflective surface and passes through the focal axis at an acute angle such that the distribution of focussed solar energy over the interior surface of the receiver is optimized for dynamic solar energy conversion.

Preferably each reflector panel section comprises a flat, hexagonally shaped truss support framework and a plurality of beam members interconnecting diametrically opposed corners of the hexagonal framework recessed within which a plurality of contoured (e.g. spherically or parabolically) reflector facets is disposed. Each reflector facet is triangularly shaped and contains a respective connector fitting at each of its corners for mechanically securing the reflector facet to a fastening location on one of the support framework or a respective beam member of a hexagonal reflector panel section. The depth of the framework and the beam members is greater than the thickness of a reflector facet such that a reflector facet may be tilted (for controlling the effective focus of its reflected light through the receiver aperture) without protruding from the panel section. To facilitate focus-contouring of the individual facets during the manufacturing process, each reflector facet preferably has a contoured (e.g. spherical or parabolic) reflective surface. By configuring the panel sections as substantially flat, hexagonally-shaped units within which the reflector facets are recessed, it is possible to stow the panel sections within the cargo bay of the space shuttle in a compact, stacked arrangement and, at the same time, provide protection for the reflector facets.

DETAILED DESCRIPTION

Prior to describing the improved solar concentrator system in accordance with the present invention, it is initially useful to consider the problems associated with conventional gimballed parabolic dish arrangements which are solved by the present invention.

Figure 1:
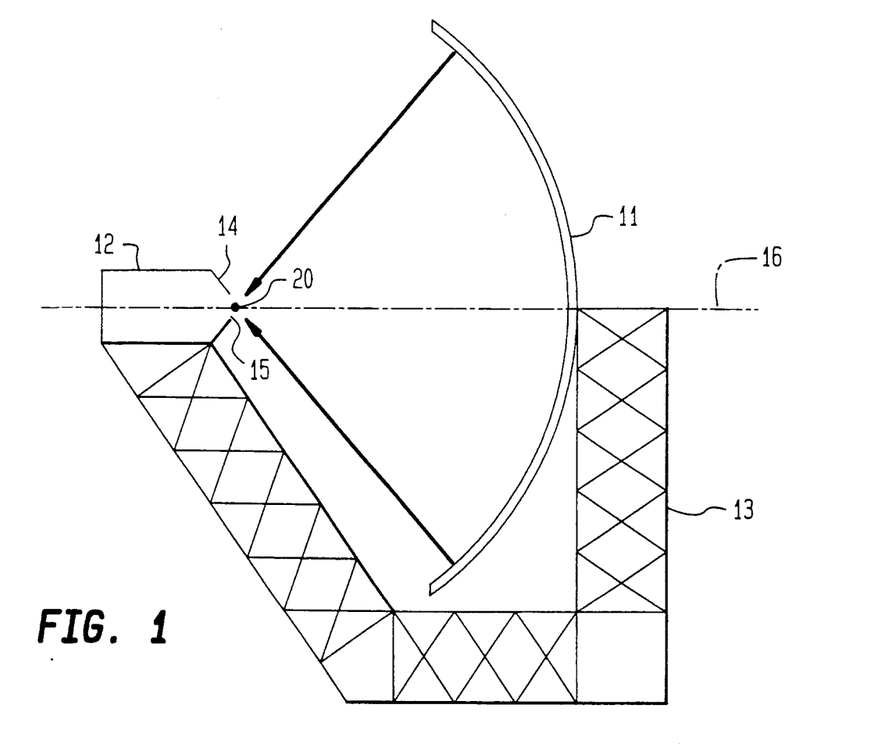
FIG. 1 is a diagrammatic side view of a conventional symmetrical parabolic dish solar concentrator.

With attention directed to FIG. 1, there is shown a diagrammatic side view of a symmetrical parabolic dish concentrator comprised of a paraboloidal reflector dish 11, rotated about optical axis 16, and an associated cylindrically configured solar energy receiver 12, which is fixedly connected with dish 11 by way of an interconnecting support structure 13. The optical axis 16 of parabolic dish 11 is coincident with the axis of a cylindrical solar receiver 12. Because receiver 12 is cylindrically configured, substantially all of the sunlight that is reflected by dish 11 (through its focal point 20) is intercepted by the available flux-collecting surface area (the interior cylindrical sidewall) of receiver 12, so that the receiver possesses a highly efficient energy coupling interior surface area. The open light receiving input end of receiver 12 has a tapered shroud 14 with an aperture 15 through which sunlight, that has reflected off the surface of dish 11, enters into the interior and impinges upon the cylindrical sidewall of the receiver 12. Receiver 12 is typically located relative to the focal point 20 of dish 11 so as to provide as even a distribution as possible (on its interior cylindrical sidewall) of the impinging optical flux which passes through focal point 20.

Figure 2:
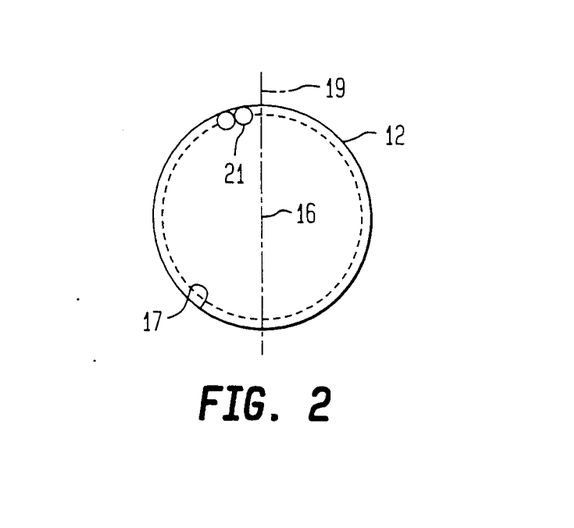
FIG. 2 diagrammatically shows a cylindrical receiver in cross-section.

FIG. 2 diagrammatically shows the cylindrical engine 12 in cross-section. As shown therein, the interior cylindrical sidewall of the engine 12 contains a plurality of longitudinally extending pipes 21 through which a working fluid is circulated and coupled to a heat exchanger (not shown). Since parabolic dish 11 is symmetric about axis 16, which is coincident with the longitudinal axis of the cylindrical receiver 12, the concentrator arrangement shown in FIG. 1 ensures that there is a substantially even distribution of collected solar energy in a circumferencial direction about axis 16. Namely, relative to a plane, shown at 19 in FIG. 2, that contains axis 16 and lies in the plane of the drawing of FIG. 1 so as to effectively bisect parabolic dish 11 and receiver 12, whatever solar energy is reflected by dish 11 into receiver 12 is distributed three-dimensionally around the interior surface 17 of receiver 12 in a manner that is even or symmetrical with respect to plane 19. (Cylindrical receivers can tolerate a heat variation in the axial direction, namely in the direction in which the working fluid flows down the pipes, but not in the circumferential direction (typically no greater than a five percent deviation in the circumferential direction).)

As described briefly above, one of the problems with the symmetrical arrangement diagrammatically illustrated in FIG. 1 is the substantial shading and support penalty incurred. Additional shading from other system components (engine, radiators, generator) is results if the components are located close to the receiver (which is desired). A reduction in the shading and support penalty can be obtained by using an offset reflector configuration, in which the reflector surface is located to one side of the optical axis, rather than being symmetrically disposed around the optical axis, as is the case for the configuration shown in FIG. 1.

Figure 3:
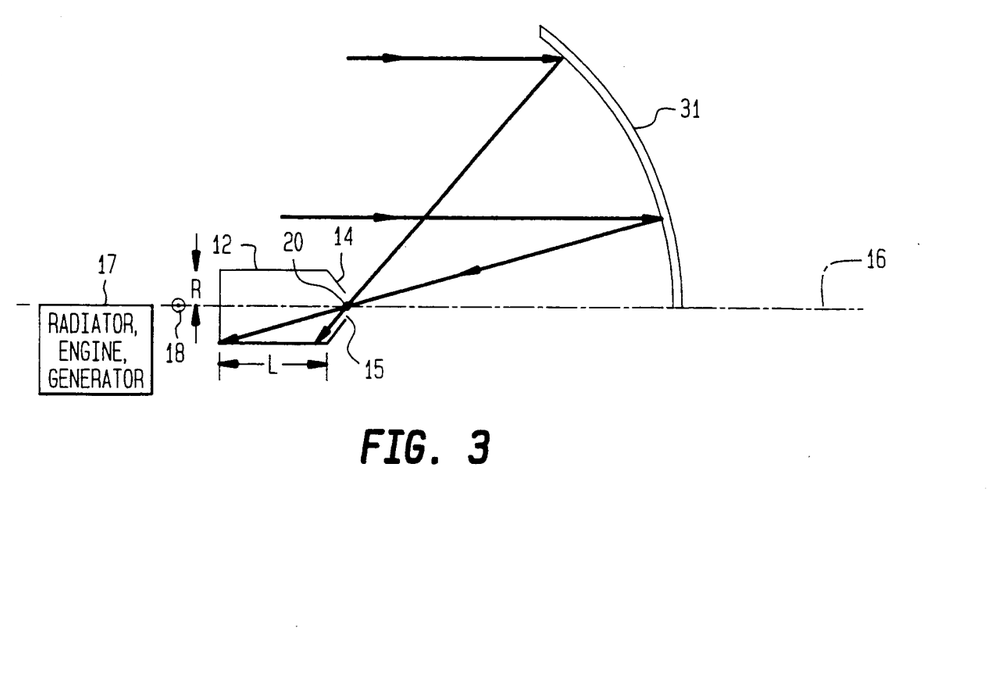
FIG. 3 is a diagrammatic illustration of an offset paraboloidal reflector substituted in place of the symmetrically disposed paraboloidal reflector in the solar concentrator of FIG. 1.
Figure 4:
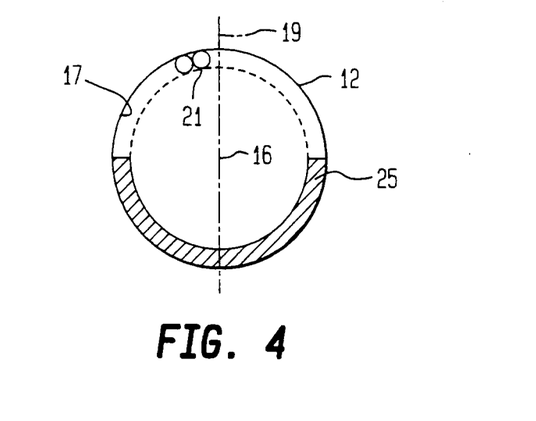
FIG. 4 illustrates the partial flux incidence surface area of the interior sidewall of an untilted cylindrical receiver for the offset reflector geometry of FIG. 3.

More specifically, with attention directed to FIG. 3, there is shown a diagrammatic illustration of a solar concentrator system having system components 17 (e.g. radiator, solar engine, generator) located in close proximity to the gimbal axis 18, and an offset paraboloidal reflector 31 to be substituted in place of the symmetrically disposed paraboloidal reflector 11 in FIG. 1. As shown in FIG. 3, because only a portion of the paraboloidal reflector is employed (the lower portion of the reflector of FIG. 1 having been eliminated), sunlight which is incident on the reflector and focused through the entrance aperture 15 of the receiver 12 is collected only along a portion of its untilted cylindrical sidewall. This partial flux incidence surface area (symmetrically distributed on either side of plane 19) is illustrated as region 25 in the cross-sectional diagrammatical illustration of FIG. 4.

As pointed out above, a cylindrically-configured receiver cannot tolerate substantial temperature deviations in its circumferential direction. From the illustrations in FIG. 3 and 4, it will be appreciated that simply substituting an offset paraboloid reflector for the symmetrical dish of FIG. 1 in an attempt to solve its inherent shadowing and support problems will create 'hot spots' on the interior sidewall of the receiver and effectively render it inoperative for its intended purpose.

Pursuant to the present invention, however, by tilting the receiver at an acute angle relative to the optical axis of the reflector, advantage can be taken of the shadowing and support reduction features of an offset parabolic reflector when used with a symmetrically shaped receiver (e.g. a cylindrical receiver whose interior surface is symmetrical with respect to a plane containing the axis of the cylinder through which the shape is the receiver is defined. This geometric relationship is illustrated diagrammatically in FIG. 5 which shows the geometry of the original symmetrical 'parent' paraboloidal dish 11 and its offset portion 31 as viewed along the optical axis 16, together with a sectional slice along the optical axis through the offset paraboloidal reflector 31, with the longitudinal axis 30 of the cylindrical receiver 12 intersecting the reflector 31 and being tilted at an acute angle $\Phi$ relative to the optical axis 16. As can be seen from projection lines 33 representing rays of sunlight that have been reflected by reflector 31 and focussed through its focal point 20 to be incident upon the interior cylindrical sidewall of the receiver 12, reflected rays are more evenly concentrated over only the lower portion of the cylindrical optical flux-collecting surface area of the interior of the receiver, (as in the configuration of FIG. 3 referenced above). Namely, 'hot spots' are avoided. Consequently, a solar concentrator geometry having an offset reflector in combination with a tilted cylindrical receiver not only solves the weight and shadowing problems of conventional concentrator systems, described previously, but permits the use of a very efficient receiver.

Figure 5:
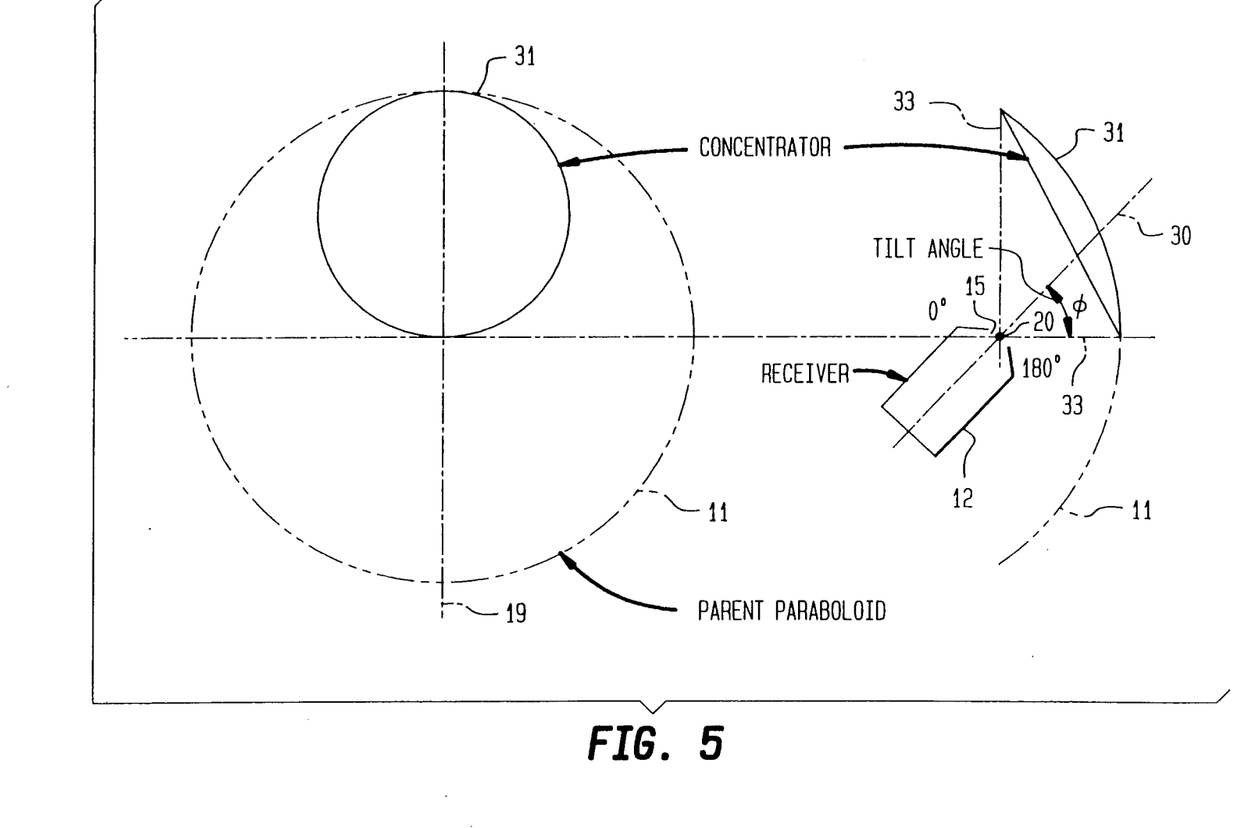
FIG. 5 diagrammatically illustrates a solar concentrator according to the present invention having an offset reflector geometry and a cylindrical receiver tilted at an acute angle relative to the optical axis.

In the solar energy concentrator configuration of FIG. 5, what is shown is a diagrammatic illustration of the basic reflector and receiver geometry. When considering the practical size of a solar collector concentrator in a spaceborne environment, the translation of such ideal geometry into a practical working embodiment requires the evaluation of a number of parameters, particularly when considering the transport mechanisms that are currently available.

More specifically, the stowage and deployment of any space structure is necessarily governed by the capacity of the cargo carrier/launch system. At present, the optimum space cargo transport that has been developed is the space shuttle. Using the space shuttle cargo bay cross-section as a constraining reference, we have been able to realize a modular solar concentrator system comprised of a tilted symmetrically shaped (e.g. cylindrical) receiver and an offset reflector surface of revolution (e.g. paraboloid) that is piecewise-approximated by interconnecting a plurality of flat interconnected reflector panel sections, which are geometrically sized to maximize their stowage efficiency within and to facilitate their space deployment from the space shuttle cargo bay.

Pursuant to the present invention, the reflector structure of the solar energy concentrator system is formed of a plurality of hexagonally-shaped solar energy reflector panel sections which are interconnected with one another along the sides thereof to form a piecewise approximation of a prescribed offset portion of the parabolic surface of revolution. Each hexagonal reflector Panel section is preferably comprised of a flat-shaped truss support framework within which a plurality of recessed triangular-shaped, spherically contoured reflector facets are supported. Each recessed reflector facet may be individually aimed (tilted), so as to tailor its focussing properties in accordance with an optimized solar collection geometry characteristic.

Figure 6:
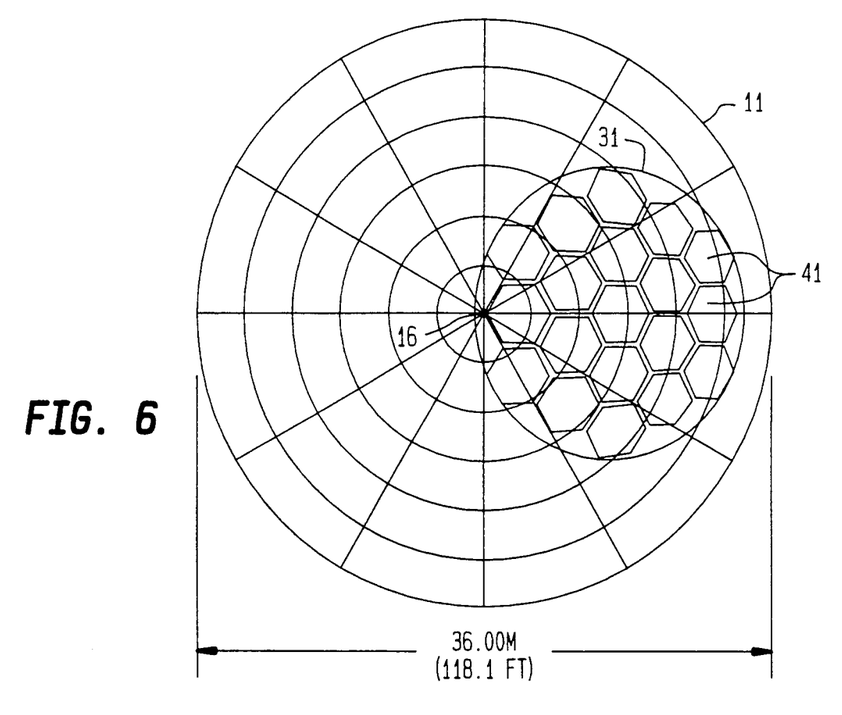
FIGS. 6 and 7 diagrammatically illustrate the geometrical disposition of hexagonally shaped reflector panel sections interconnected so as to piecewise approximate the offset portion of a paraboloidal reflector surface of the concentrator shown in FIG. 5.
Figure 7:
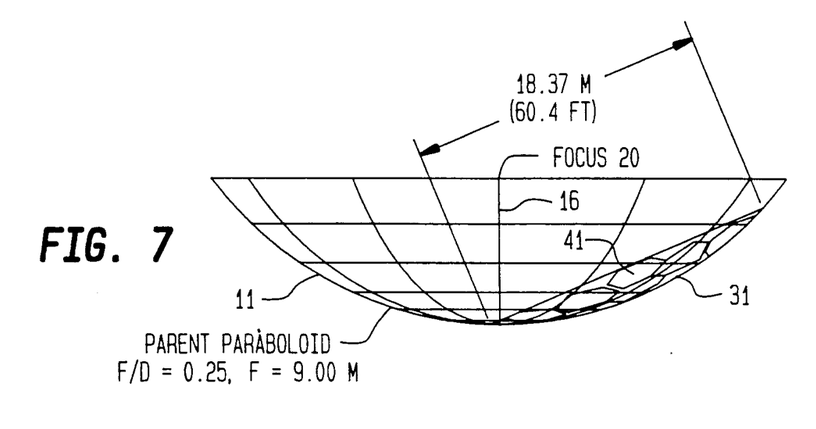
Figure 8:
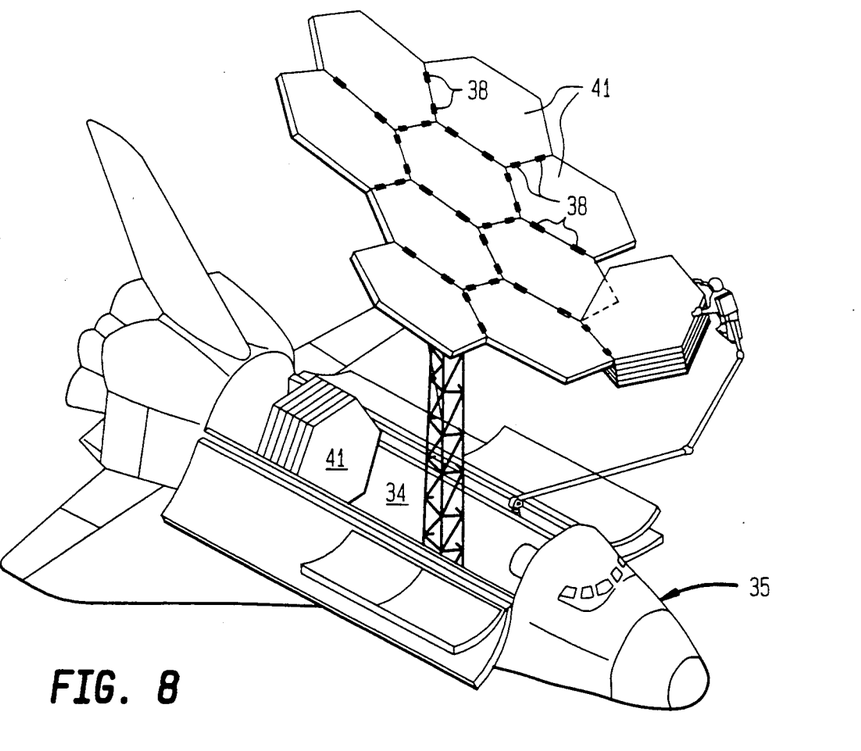
FIG. 8 pictorially illustrates the stowage of panel sections in and their deployment from the available stowage area of the space shuttle cargo bay., FIG. 9 diagrammatically illustrates a hexagonal truss support framework and individual triangularly-shaped reflector facets supported thereby.

The geometrical disposition of the hexagonally shaped reflector panel sections that are interconnected so as to piecewise approximate the offset portion of a paraboloidal reflector surface of the concentrator is shown in FIGS. 6 and 7, which are respective views taken along and orthogonal to the optical axis 16 of the concentrator. Using, as an example, a thirty-six meter diameter 'parent paraboloidal reflector surface 11, having a focal length of nine meters, (which yields a focal length to dish diameter ratio (F/D) of 0.25), then by choosing the width of each of a plurality of hexagonally shaped reflector panel sections 41 to be slightly greater than four meters (on the order of fourteen feet), in order to make optimal use (maximize the 'fit') of the panel sections within the available stowage area of the cargo bay 34 of the space shuttle 35, shown pictorially in FIG. 8, and allowing for pairs of adjustable spacing hinged fasteners 38 (which may be coupled with latching mechanisms to secure the panel sections relative to one another) along their hexagonal perimeters, it is possible to compactly stow and deploy an approximately seventeen meter diameter (in the direction of the optical axis) offset reflector 31 by assembling together nineteen such panel sections. As the details of the hinged fasteners and associated latching mechanisms are unnecessary for an appreciation of the present invention, they will not be described in detail. Suffice it to say that the fastener/latching mechanisms may include threaded link connections to provide for adjustment of the spacing between the panels in the course of their distribution and piecewise deployment of the offset portion 31 of the paraboloid of revolution shown in FIGS. 6 and 7.

Figure 9:
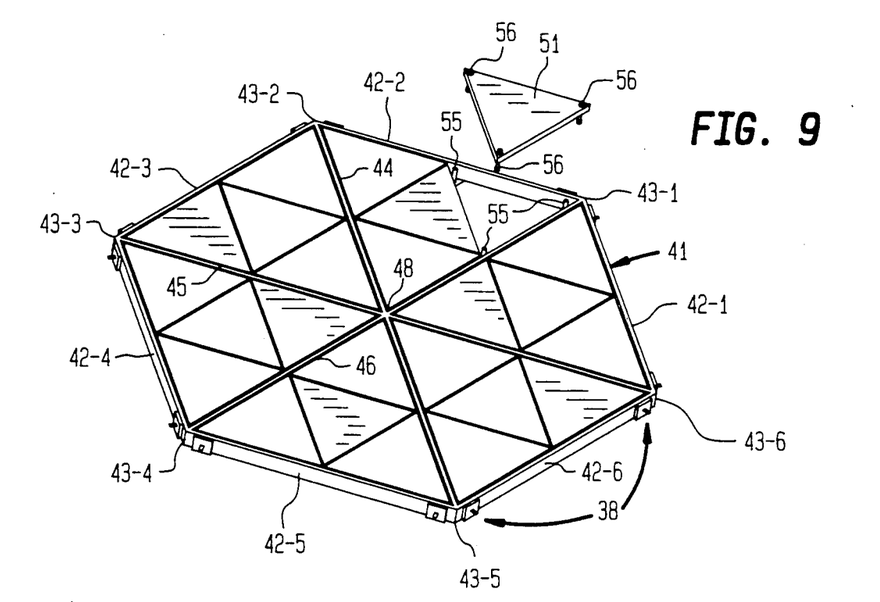

As pointed out above, each individual hexagonal reflector panel section 41 is formed of a (hexagonally shaped) truss framework containing a plurality of beam members which interconnect diametrically opposed corners of the framework. Such a framework, as well as the individual triangularly-shaped reflector facets to be supported by the framework is illustrated diagrammatically in FIG. 9. As shown therein, the truss framework of an individual hexagonally-shaped panel section 41 is formed of a plurality (i.e. six) interconnected outer perimeter wall members 42-1 . . . 42-6, the vertical thickness or height of each of which is sufficient permit mirror facets to be recessed between the top and bottom surfaces of the panel sections. Interior truss bracing of each panel section is accomplished by a set of beam members 44, 45 and 46 which extend between the vertices or corners 43-1 . . . 43-6 and the center 48 of the panel section. Each of beam members 44, 45 and 46 may be a conventional bar beam, I-beam section, or an inverted T-section to maximize the available space for locating a plurality of triangular-shaped facets 51.

At the respective vertices 43-1 . . . 43-6, at the intersection of the beams 44, 45 and 46 at the center 48, and at mid-points of the wall members 42-1 . . . 42-6 and the beams 44, 45 and 46 there are located respective fastener anchors 55 to which respective hinged fasteners 56 at the corners of the triangular-shaped facets 51 are adjustably connectable, so as to afford control of the tilt and extent of recess of the facets within the panel section. In the exemplary embodiment shown in FIG. 9, an individual hexagonal panel section 41 is comprised of twenty four facets. Each facet (or mirror) is preferably configured of lightweight reenforced plastic or glass, shaped as an equilateral triangle in plan in order to optimize the use of the interior space within the hexagonal truss framework of the panel section 41. Because of their small size compared with the overall dimensions of the reflective concentrator, the triangular facets 51 may be spherically contoured and thereby facilitate manufacture, without introducing large optical errors Threaded apertures at the corners of each facet facilitate attachment of the facets (by way of threaded fasteners 56) to (the connection anchors 55 of) the truss framework, so that the focussing angle or tilt of each individual facet may be adjustably preset within an individual hexagonal truss panel section prior to launch and space deployment. Moreover, the recessing of the facets within the confines of the hexagonal framework allows the panels sections to be manufactured flat, rather than in a contoured shape, thus facilitating manufacturability and stowability (in the compact stacked arrangement shown in FIG. 8).

As noted briefly above, the hexagonally-shaped flat panel sections 41 cannot be simply abutted edge-to-edge to conform with any prescribed surface. Edge-to-edge abutment of all of the panels is possible only in a common plane. The formation of a three-dimensional contour requires that there be spacing (usually uneven and varying among the panels) provided between the edges of the panels. The exact spacing chosen among the respective panels will depend upon the parameters of the intended geometry, such as surface (e.g. paraboloid) diameter, focal length, panel size and the location of the panels on the offset portion of the paraboloid, and is preferably determined using analytical geometry. (As the details of such a mathematical analysis are not necessary for an understanding of the present invention they will not be described here.) In the distribution of the nineteen panels that are joined together to form a piecewise approximation of the offset parabolic reflector for the geometry of FIGS. 6 and 7, it can be seen that the spacing among the various panel sections is not even and opposing faces of adjacent panel section sidewalls are not necessarily parallel with one another. It has been found that the variation in spacing or gap between panels of the embodiment given here as an example may range on the order of two to fourteen inches.

In addition to arranging the hexagonally-shaped panel sections to piecewise approximate the prescribed offset portion 31 of the 'parent' paraboloidal reflector 11, it is necessary to Properly configure and orient the individual triangular facets that are recessed within the panel sections so as to achieve the intended focussing properties and optical flux distribution on the interior cylindrical sidewalls of the solar engine.

Figure 10:
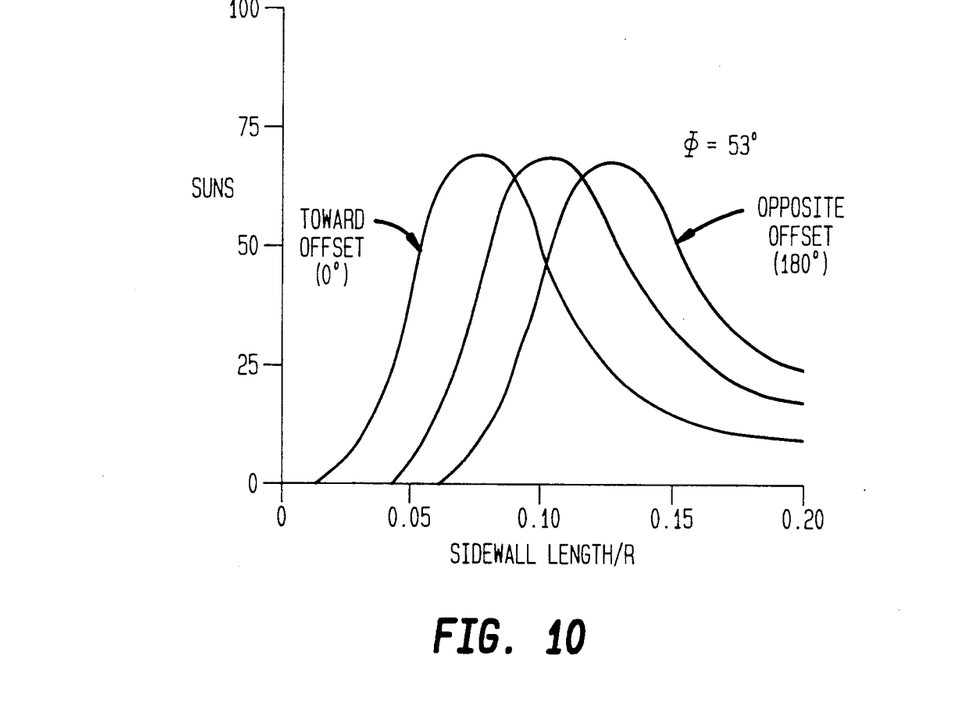
FIG. 10 is a graphical illustration of the relationship between optical intensity and the ratio of sidewall length to radius within the cavity of a cylindrical solar engine for a prescribed tilt angle Φ of 53°.

FIG. 10 is a graphical illustration of the relationship between optical intensity and the ratio of sidewall length to radius within the cavity of a cylindrical solar engine for a tilt angle $\Phi$ of 53° in the geometry diagram in FIG. 5. As shown in FIG. 10, by changing the receiver tilt angle $\Phi$, the peak of the flux will translate axially. However, as noted previously, a cylindrical cavity can tolerate variations in flux intensity in the axial direction. The problem of engine failure occurs when there are variations in the circumferential direction (unwanted hot spots) which effectively destroy the usefulness of the solar engine.

As noted above, because of their small size, the triangular mirror facets of which the hexagonal reflector panel sections are configured may be spherically contoured, to simplify their manufacturing process. The choice in the radius of curvature of the spherical contour will, of course depend upon the parameters of the geometry of both the surface area of the cylindrical solar engine to which the beam from an individual facet is directed and the location of that facet on the paraboloid. Given the parameters in the example described here, an evaluation was conducted on the error associated with a facet of a given size, in order to optimize the size of the facets to be employed. For this purpose, the following procedure was employed, using the geometrical relationship illustrated in FIG. 11.

Figure 11:
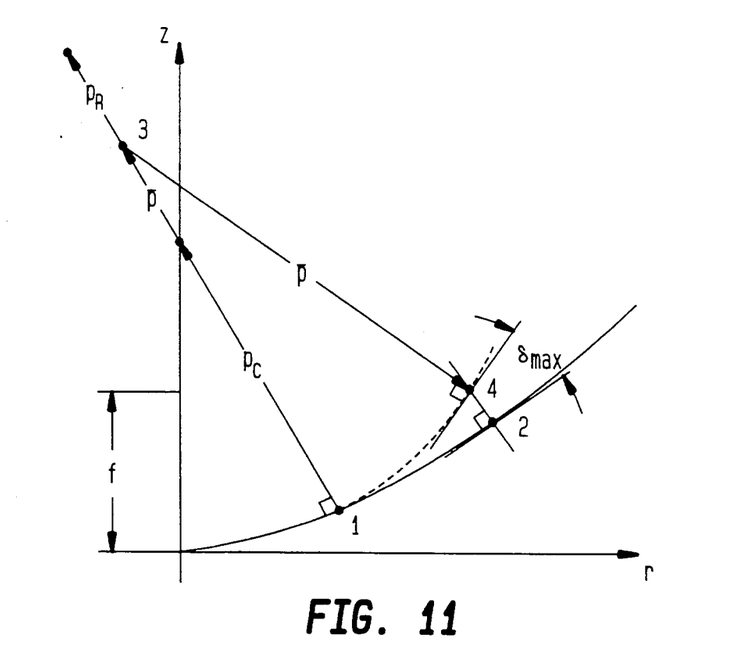
FIG. 11 is a geometrical diagram for explaining the derivation of the size and curvature of the reflector facets that make up the reflector surface of the offset paraboloid concentrator of FIG. 5.

First, the spherical radius at the point of interest P1 on the reflector surface is determined. Next, at a second point P2 an equivalent facet radius outward from the first is located. Then, the coordinates of the center of curvature at point P3 of the mean instant radius of curvature is determined The next step is to find the intersection point P4 of the normal to point P2 an the spherical arc. Finally, the slopes of the tangents to the intersection and the second point P2 on the paraboloid are determined and compared.

All of the instant radii of curvature for any point on the paraboloid lie along a normal to that point. For purposes of the present description, the reflector geometry may be defined in cylindrical coordinates (r,z), where $r^2 = x^2 + y^2$.

The paraboloid to be piecewise approximated is defined by the expression $z = r^2/(4f)$, where f is the focal length of the paraboloid. The instant radius in the radial direction may be derived from the formula of the paraboloid $$\rho_R = [1 + (dz/dr)^2]^{3/2}/(d^2z/dr^2)$$

which reduces to $$\rho_R = 2f[1 + (r/2f)^2]^{3/2}.$$

The instant radius in circumferencial direction may be taken as the distance between the point on the surface of the reflector and the axis of symmetry along a normal to the surface at that point.

Figure 12:
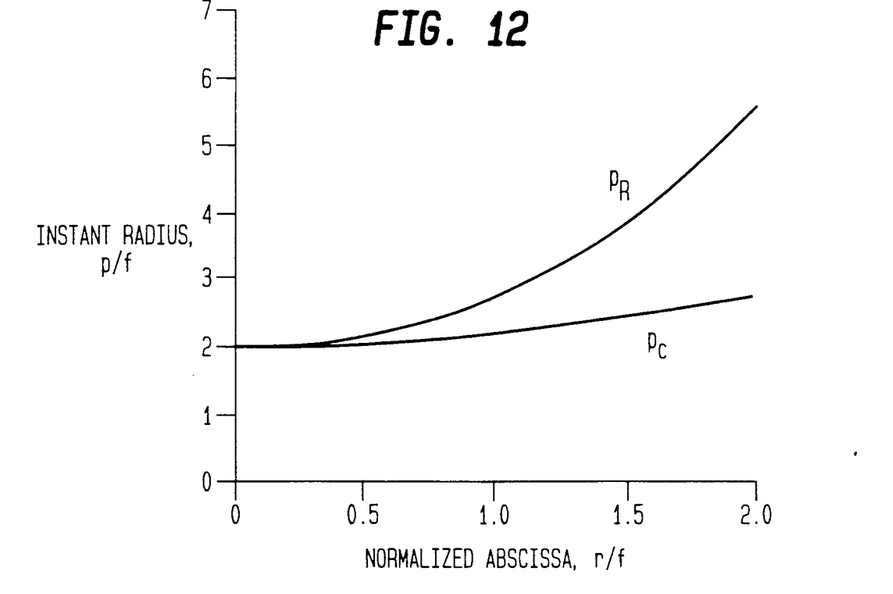
FIG. 12 diagrammatically illustrates the relationship between instant radius and normalized abscissa in defining the curvature of the reflector facets with the geometrical diagram of FIG. 11.

For a paraboloid, this value is $\rho_C = (r^2 + 4f^2)^{\frac{1}{2}}$. The difference between the radial and circumferential instant radius is illustrated in FIG. 12. The spherical radius that yields the best approximation to the paraboloid at any single point is $$\rho = (\rho_R + \rho_C)/2.$$

It is to be noted that, for a single point, corresponding to an infinitesimal facet, no aberrations are introduced by the spherical approximation. These only arise as the approximation is extended to facets of finite size. It should also be observed that the radial instant radius changes faster than the circumferential instant radius and, accordingly, controls the limit for the size of an individual facet.

The coordinates of the point radially outward from the point of interest by a facet radius ($r_F$) measured along the paraboloid are $$r_2 = r_F[1 + (r_1/2f)^2]^{-\frac{1}{2}} + r_1, \text{ and}$$

$$z_2 r_2^2/(4f).$$

The coordinates of the center of spherical curvature are given by $$r_3 = -\tfrac{1}{2}(\rho_R - \rho_C)[1 + (2f/r_1)^2]^{-\frac{1}{2}}, \text{ and}$$

$$z_3 = \tfrac{1}{2}(\rho_R - \rho_C)(2f/r_1)[1 + (2f/r_1)^2]^{-\frac{1}{2}} + z_1 + 2f.$$

The coordinates of the point of intersection (point 4) between the normal to point 2 and the spherical arc are $$r_4 = -(b/2a) + ((b/2a)^2 - (c/a))^{\frac{1}{2}}, \text{ and}$$

$$z_4 = z_2 + 2f - (2f/r_2)r_4,$$

where $$a = 1 + (2f/r_2)^2$$

$$b = (4f/r_2)[z_3 - (z_2 + 2f)] - 2r_3, \text{ and}$$

$$c = (z_2 + 2f)[(z_2 + 2f) - 2z_3] + r_3^2 + z_3^2 - \rho^{-2}.$$

The slopes at points 2 and 4 are $$m_2 = r_2/(2f) \text{ and}$$

$$m_4 = (r_3 - r_4)/(z_4 - z_3) \text{ and}$$

the maximum slope error is then $\delta_{max} = m_4 - m_2$.

Using the mean value theorem to define the value for mean slope error then $\delta = \tfrac{2}{3}\delta_{max}$, where the equivalent radius is defined as $$r_F = (A/\pi)^{\frac{1}{2}},$$

where A is the actual area of the individual triangular facet.

Using the above relationships, the mean slope error for a spherical contoured triangular facet may be tabulated as follows:

TABLE I

Mean slope error of spherical facets versus size and radial distance from the axis of a parabolic reflector having a 9 meter focal length.

| SIZE | RADIAL DISTANCE | MEAN SLOPE ERROR |
|---|---|---|
| 0.5 m | 0.0 m | 0.0 mrad |
|  | 9.0 | 0.7 |
|  | 18.0 | 1.7 |
| 1.0 m | 0.0 m | 0.0 mrad |
|  | 9.0 | 1.6 |
|  | 18.0 | 3.4 |
| 2.0 m | 0.0 m | 0.0 mrad |
|  | 9.0 | 3.4 |
|  | 18.0 | 7.2 |

Given the above evaluation, one meter facets where chosen for the geometry of the presently described example. Given the one meter facet size and spherical radii selected for each location on the reflector surface, it is then necessary to minimize the aspect ratio of the projected image. This is accomplished by making small changes to the radii of the facets using a reflector ray tracing model until the best balance between the aberration in the radial and circumferential directions is achieved. The use of ray tracing is more expedient than direct analysis, since the actual facet geometry orientation and positional error are taken into account simultaneously.

Figure 13:
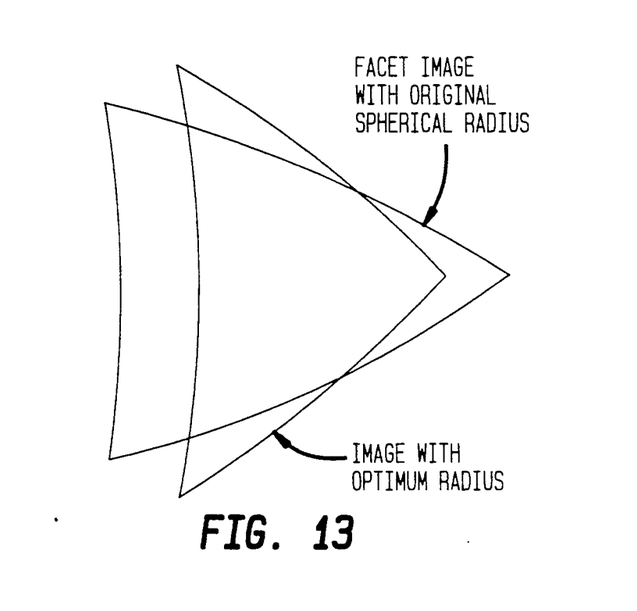
FIG. 13 shows a typical image plot resulting from spherically configured facets located on a paraboloid of interest.

FIG. 13 shows a typical image plot resulting from spherically configured facets located on the paraboloid of interest. As can be seen therein, by varying the radius, the shape of the image projected by the facet can be adjusted, to tailor the optical flux impinging upon the cylindrical sidewall of the receiver.

Although in the foregoing description, an offset parabola of revolution has been described as the reflector surface which is to be piecewise approximated by the hexagonal sections and optimized by tailoring the spherical shape and angle of orientation of the individual triangular facets, it is to be observed that the present invention is applicable to other surface contours. As the radius of curvature of the contour changes, particularly where the radius of curvature decreases, it follows that the depths of the hexagonal panel sections must increase to allow for a greater degree of tilt of the individual facets that are recessed within the panels. Such an increase in depth constitutes an increase in cost and cargo bay occupation volume, of course. In a preferred embodiment, however, the solar concentrator of the present invention embodies a piecewise, approximated offset paraboloid surface.

As will be appreciated from the foregoing description, the improved solar concentrator according to the present invention overcomes the shortcomings of conventional solar energy collection structures by means of configuration which possesses low area density and mass, so as to facilitate its stowage aboard the space shuttle, and which deploys to a configuration that produces no shadowing of its reflector. Through the combination of a offset reflector geometry and tilted receiver arrangement, the concentrator structure is capable of providing enhanced dynamic solar energy conversion and is able to maintain a low moment of inertia about its gimbal-mounting axis through which the concentrator is mounted to an attendant support structure (e.g. space station).

While we have shown and described an embodiment in accordance with the present invention, it is to be understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. A concentrating solar collector for use in a solar energy system comprising:

a solar energy reflective surface having the configuration of a portion of a surface of revolution rotated about a prescribed focal axis, said portion of said surface of revolution being offset from said prescribed focal axis; and a solar energy receiver having a solar energy receiving aperture and a three-dimensional optical flux receiving surface exposed thereby, said three-dimensional optical flux receiving surface being symmetrical with respect to a plane containing a solar energy receiver axis which passes through and forms an acute angle with said prescribed focal axis and intersects said solar energy reflective surface, wherein said solar energy reflective surface is comprised of a plurality of interconnected reflector panel sections, each panel section containing a plurality of reflector facets the reflective surface of which effectively focus light reflected thereby to preselected surface portions of the optical flux collecting surface of said receiver that are symmetric with respect to said plane, and wherein the perimeter of a reflector panel section is shaped in the form of regular polygon and the perimeter of a perspective reflector facet contained therein is shaped in the form of a regular polygon; and wherein a respective reflector panel section comprises a hexagonally shaped support framework and a plurality of base members interconnecting diametrically opposed corners of said hexagonal framework.

2. A concentrating solar collector according to claim 1, wherein a respective reflector facet is triangularly shaped and contains a respective connection means located at each of the corners thereof, for mechanically securing said reflector facet to a fastening location on one of the support framework or a respective beam member of a hexagonal reflector panel section.

3. A concentrating solar collector for use in a solar energy system comprising:

a solar energy reflective surface having the configuration of a portion of a surface of revolution rotated about a prescribed focal axis, said portion of said surface of revolution being offset from said prescribed focal axis; and a solar energy receiver having a solar energy receiving aperture and a three-dimensional optical flux receiving surface exposed thereby, said three-dimensional optical flux receiving surface being symmetrical with respect to a plane containing a solar energy receiver axis which passes through and forms an acute angle with said prescribed focal axis and intersects said solar energy reflective surface, wherein said solar energy receiver comprises a receiver having an optical flux-collecting surface of revolution, one end of which has a light receiving aperture through which solar energy reflected by said reflective surface enters said receiver and is incident upon the optical flux-collecting surface of revolution thereof, wherein said receiver has a cylindrically shaped optical flux receiving surface, wherein said solar energy reflective surface is comprised of a plurality of interconnected reflector panel sections, each panel section containing a plurality of reflector facets, the reflective surfaces of which effectively focus light reflected thereby to preselected surface portions of the optical flux collecting surface of said receiver that are symmetric with respect to said plane, and wherein each reflector panel section is comprised of a substantially flat, hexagonally shaped truss support framework within which a plurality of recessed reflector facets are supported thereby.

4. A concentrating solar collector for use in a solar energy system comprising:

a solar energy reflective surface having the configuration of a portion of a surface of revolution rotated about a prescribed focal axis, said portion of said surface of revolution being offset from said prescribed focal axis; and a solar energy receiver having a solar energy receiving aperture and a three-dimensional optical flux receiving surface exposed thereby, said three-dimensional optical flux receiving surface being symmetrical with respect to a plane containing a solar energy receiver axis which passes through and forms an acute angle with said prescribed focal axis and intersects said solar energy reflective surface, wherein said solar energy receiver comprises a receiver having an optical flux-collecting surface of revolution, one end of which has a light receiving aperture through which solar energy reflected by said reflective surface enters said receiver and is incident upon the optical flux-collecting surface of revolution thereof, wherein said receiver has a cylindrically shaped optical flux receiving surface, wherein said solar energy reflective surface is comprised of a plurality of interconnected reflector panel sections, each panel section containing a plurality of reflector facets, the reflective surfaces of which effectively focus light reflected thereby to preselected surface portions of the optical flux collecting surface of said receiver that are symmetric with respect to said plane, and wherein a respective hexagonal reflector panel section comprises a hexagonally shaped support framework and a plurality of beam members interconnecting diametrically opposed corners of said hexagonal framework, the depth of said framework and said beam members being greater than the thickness of a reflector facet such that a reflector facet may be tilted without protruding from said panel section.

5. A concentrating solar collector according to claim 4 wherein a respective facet is triangularly shaped and contains a respective connection means, located at each of the corners thereof, for mechanically securing said reflector facet to a fastening location on one of the support framework or a respective beam member of a hexagonal reflector panel section.

6. A concentrating solar collector for use in a solar energy system comprising:

a solar energy reflective surface having the configuration of a portion of a surface of revolution rotated about a prescribed focal axis, said portion of said surface of revolution being offset from said prescribed focal axis; and a solar energy receiver having a solar energy receiving aperture and a three-dimensional optical flux receiving surface exposed thereby, said three-dimensional optical flux receiving surface being symmetrical with respect to a plane containing a solar energy receiver axis which passes through and forms an acute angle with said prescribed focal axis and intersects said solar energy reflective surface, and wherein said solar energy reflective surface is comprised of a plurality of interconnected reflector panel sections, each panel section containing a plurality of reflector facets the reflective surfaces of which effectively focus light reflected thereby to preselected surface portions of the optical flux collecting surface of said receiver that are symmetric with respect to said plane, further including means for intercoupling said panel sections along the perimeters thereof to form a piecewise approximation of said portion of said surface of revolution, and wherein each panel section contains a plurality of reflector facets the reflective surfaces of which effectively focus light reflected thereby to preselected surface portions of the optical flux collecting surface of said receiver, and wherein each reflector panel section is comprised of a substantially flat, polygon-shaped truss support framework within which a plurality of recessed reflector facets are supported thereby, so that said panel sections may be stowed in a compact, stacked configuration which provides protection to the reflector facets recessed therein.

7. A concentrating solar collector for use in a solar energy system comprising:

a solar energy reflective surface having the configuration of a portion of a surface of revolution rotated about a prescribed focal axis, said portion of said surface of revolution being offset from said prescribed focal axis; and a solar energy receiver having a solar energy receiving aperture and a three-dimensional optical flux receiving surface exposed thereby, said three-dimensional optical flux receiving surface being symmetrical with respect to a plane containing a solar energy receiver axis which passes through and forms an acute angle with said prescribed focal axis and intersects said solar energy reflective surface, wherein said surface of revolution comprises a parabolic surface of revolution, and said solar energy reflective surface is comprised of a plurality of reflector panel sections interconnected along the perimeters thereof to form a piecewise approximation of said parabolic surface, each panel section containing a plurality of reflector facets the reflective surfaces of which effectively focus light reflected thereby to preselected surface portions of the optical flux collecting surface of said receiver that are symmetric with respect to said plane, wherein the perimeter of a reflector panel section is polygon-shaped and the perimeter of a respective reflector facet contained therein is polygon-shaped, and wherein a respective reflector panel section comprises a hexagonally shaped support framework and a plurality of beam members interconnecting diametrically opposed corners of said hexagonal framework.

8. A concentrating solar collector according to claim 7, wherein a respective reflector facet is triangularly shaped and contains a respective connection means, located at each of the corners thereof, for mechanically securing said reflector facet to a fastening location on one of said support framework or a respective beam member of a hexagonal reflector panel section.

9. A concentrating solar collector for use in a solar energy system comprising:

a plurality of solar energy reflector panel sections interconnected to form a solar energy reflective surface having the configuration of a piecewise approximation of a portion of a surface of revolution rotated about a prescribed focal axis, said portion of said surface of revolution being offset from said prescribed focal axis, and each panel section containing a plurality of reflector facets the reflective surface of which effectively focus light reflected thereby to preselected surface portions of a three dimensional surface; and a solar energy receiver having a solar energy receiving aperture and a three dimensional optical flux collecting surface corresponding to said three-dimensional surface exposed thereby, said three dimensional optical flux collecting surface being symmetrical with respect to a plane containing a solar energy receiver axis which passes through and forms an acute angle with said prescribed focal axis and intersects said solar energy reflective surface, wherein said solar energy receiver comprises a cylindrically shaped receiver, one end of which has a light receiving aperture through which solar energy reflected by said solar energy reflective surface enters said receiver and is incident upon the cylindrically shaped optical flux-collecting surface of said receiver, wherein the perimeter of a reflector panel section is shaped in the form of a regular polygon and the perimeter of a respective reflector facet contained therein is shaped in the form of a regular polygon, and wherein a respective reflector panel section comprises a hexagonally shaped support framework and a plurality of beam members interconnecting diametrically opposed corners of said hexagonal framework.

10. A concentrating solar collector according to claim 9, wherein a respective reflector facet is triangularly shaped and contains a respective connection means, located at each of the corners thereof, for mechanically securing said reflector facet to a fastening location on one of the support framework or a respective beam member of a hexagonal reflector panel section, so that a respective reflector facet is recessed within said support framework.

11. A concentrating solar collector according to claim 10, wherein the depth of said framework and said beam members is greater than the thickness of a reflector facet such that a reflector facet may be tilted without protruding from said panel section.

* * * * *